3,032,537
ANIONIC POLYMERIZATION OF THIOCARBONYL DIFLUORIDE

Henry C. Walter, Brandywine Hundred, Del., assignor to E. I. du Pont de Nemours and Company, Wilmington, Del., a corporation of Delaware
No Drawing. Filed July 16, 1959, Ser. No. 827,443
3 Claims. (Cl. 260—79)

This invention relates to a process for the polymerization of thiocarbonyl difluoride and more particularly to an improved process for the anionic homopolymerization of thiocarbonyl difluoride using an alkoxide of aluminum or titanium as a catalyst.

Homopolymers of thiocarbonyl difluoride are particularly useful because of the particular combination of properties that they possess. In addition to exhibiting a high degree of chemical inertness, they are soluble in certain organic solvents. This solubility permits their use as coating compositions for application to various substrates such as wood, metal and glass.

It is known that thiocarbonyl difluoride can be anionically homopolymerized. A wide variety of ionic initiators have been disclosed such as dimethyl formamide, primary, secondary and tertiary amines (e.g. triethylamine, diisopropylamine, and aniline), triphenylphosphine, nitrosodimethylamine, quaternary ammonium chlorides having no hydrogen on the quaternary ammonium nitrogen (e.g. tetraethyl ammonium chloride) and the like. Dimethyl formamide has been considered a particularly effective initiater. The initiators have been employed in concentrations ranging from about 0.2 to 20 percent by weight of monomer. Bulk and solution polymerizations have been carried out at temperatures ranging from about −120° C. to 0° C.

Unfortunately, the catalysts heretofore known leave something to be desired unless the thiocarbonyl difluoride is at least 95 percent pure and contains no hydrogen chloride. This necessitates the use of rather costly purification processes for the thiocarbonyl difluoride before polymerization thereof can be carried out.

It is an object of the present invention to provide an improved process for polymerizing thiocarbonyl difluoride. A further object is to provide a process for the anionic homopolymerization of thiocarbonyl difluoride whereby it is possible to homopolymerize this fluoride when it contains small amounts of hydrogen chloride or when it has a purity of less than 95 percent. A still further object is to provide a process for the anionic homopolymerization of thiocarbonyl difluoride wherein an ether soluble alkoxide of aluminum or titanium is used as the catalyst.

These and other objects of this invention are accomplished by an improvement in the process of homopolymerizing thiocarbonyl difluoride which comprises contacting the thiocarbonyl difluoride at a temperature of from about −80° C. to −10° C. in an inert solvent with from about 0.1 to 10.0 mole percent of a diethyl ether-soluble alkoxide of aluminum or titanium.

As mentioned above, homopolymers of thiocarbonyl difluoride are known; however, the processes which have been used heretofore for the preparation of these homopolymers leave something to be desired. By means of the process of the present invention, wherein an alkoxide of aluminum or titanium is used as the catalyst, it is possible to homopolymerize thiocarbonyl difluoride which either has a small amount of hydrogen chloride or has a purity of less than 95 percent and still obtain high molecular weight homopolymers in good yield. The homopolymers of thiocarbonyl difluoride which are prepared according to the improved process of the present invention can be shaped into a wide variety of useful objects by extrusion, pressing or molding. Thus, these homopolymers can be pressed into rubbery, flexible, self-supporting films.

In accordance with the process of the present invention the thiocarbonyl difluoride is homopolymerized by introducing the monomer into a solution of the catalyst in an inert solvent at a temperature of from about −80° C. to about −10° C. The reaction vessel should have a liner of glass or stainless steel. If desired, when temperatures below −50° C. are employed, the catalyst may be added to a solution of the monomer in an inert solvent. The homopolymerization of thiocarbonyl difluoride occurs very rapidly at these temperatures and in general a reaction time ranging from about 0.5 to 4 hours is satisfactory. The polymerization is generally carried out at atmospheric pressure, however, superatmospheric pressure can be employed, particularly at temperatures above about −54° C. In the latter event, the reaction is carried out at autogenous pressure in a closed reaction vessel. After the homopolymer of thiocarbonyl difluoride has been formed, it will not be adversely affected by continued contact with the catalyst. When the polymerization is completed the polymer is precipitated by contacting the reaction mixture with a large volume of a non-solvent for the polymer such as water or, preferably, methanol. The coagulum is then washed with methanol, or leached with water, and then dried.

As mentioned above, the polymerization process is to be carried out at temperatures ranging from −80° C. to about −10° C. The temperature range of from about −80° C. to about −40° C. is preferred. As the temperature of the polymerization is raised, the molecular weight of the resulting polymer tends to be lower. The amount of catalyst employed in the process of the present invention should range from about 0.1 to 10 mole percent. When preparing high molecular weight polymers (exhibiting inherent viscosities above about 0.7) it is preferred to employ about 0.1 to 5 mole percent of catalyst and to carry out the reaction in anhydrous diethyl ether solvent. Lower molecular weight polymers (exhibiting inherent viscosities between about 0.1 and 0.7) are preferably made in chloroform with 1.0 to 10 mole percent catalyst. Inherent viscosities above 1.0 correspond to number-average molecular weights greater than about 200,000.

The molecular weight attained by the polymer is affected by the reaction temperature (as mentioned above), the nature of the solvent and, less importantly, by the catalyst concentration. At constant solvent and temperature, an increase in the catalyst concentration results in a decrease in the molecular weight of the polymer.

The inert solvents which may be employed include aliphatic (saturated) and aromatic hydrocarbons, chlorinated aliphatic (saturated) hydrocarbons and chlorinated aromatic hydrocarbons, acyclic (saturated) aliphatic ethers, aromatic ethers and heterocyclic (saturated) aliphatic ethers. Representative solvents include isopentane, pentane, cyclopentane, n-hexane, 2,2,4-trimethylpentane, methylcyclohexane and isooctane; toluene, m-xylene and cumene; methylene chloride, ethyl chloride, cyclohexylchloride, n-octylchloride, chloroform and trimethylenechloride; m-dichlorobenzene, chlorobenzene and m-chlorotoluene; methyl ethyl ether, diethyl ether, isopropyl ether, and di-n-amylether; anisole and phenetole; tetrahydropyran, 1,3-dioxane and tetrahydrofuran. Miscible mixtures may be employed when desired. The reaction mixtures generally contain about 20 to 30 percent monomer by weight of the solvent but higher or lower concentrations may be employed when desired. The more concentrated mixtures, however, are less convenient to agitate.

The catalysts which are used in the process of the present invention are the alkoxides of aluminum or titanium which are soluble in diethyl ether. These catalysts may be represented by the structure $M(OR)_n$ wherein M is aluminum or titanium, R is an alkyl radical and $n$ is an integer having a value equal to the valence of M. The number of carbon atoms in the alkyl radical is not critical so long as the solubility criterion is obeyed. It is preferred that the alkyl radical have no more than about eight carbon atoms.

Representative examples of the catalysts which may be used in the subject process include tetraisopropyl titanate, which is preferred, aluminum tert-butoxide, triisopropyl aluminate, tetra (2-ethyl hexyl) titanate, tetra-n-butyl titanate, tetraisobutyl titanate, tetracyclopentyl titanate, tetra-2,2-dimethylpropyl titanate and tetra n-nonyl titanate. Mixtures of these catalysts may be employed, if desired.

The following examples will better illustrate the nature of the present invention; however, the invention is not intended to be limited to these examples. Parts are by weight unless otherwise indicated.

*Example 1*

(A) 22 parts of anhydrous ether is cooled to −80° C. in a dry agitated glass reaction flask provided with a dry nitrogen atmosphere and surrounded with a mixture of crushed solid carbon dioxide and acetone. 7 parts of thiocarbonyl difluoride (containing 0.1 mole percent hydrogen chloride) is distilled into the reaction flask and dissolved in the ether. During a period of about 2 hours 7.8 parts of a catalyst solution (made by dissolving 0.60 part of triisopropyl aluminate in 17.8 parts of anhydrous diethyl ether) is added to the cold agitated ethereal thiocarbonyl difluoride. Afterward, the mixture is kept at −80° C. for an additional 1¾ hours. Finally, it is warmed to room temperature and poured into 300 parts of water; heat is applied and ether is boiled off. The precipitated polymer is collected, leached with water and air dried; 3.36 parts of rubbery product is obtained exhibiting an inherent viscosity (0.1 percent solution in chloroform at 30° C.) of 3.99. It is pressed at 160–170° C. into a tough, resilient rubbery film.

(B) When 10.5 parts of thiocarbonyl difluoride (containing 0.1 mole percent hydrogen chloride) in 27 parts of diethyl ether is stirred with 0.2 part of dimethyl formamide at −80° C. for about 4 hours, 6.66 parts of a soft, weak solid is produced which has an inherent viscosity (0.1 percent solution in chloroform at 30° C.) of only 0.58.

*Example 2*

A solution of 0.36 part of tetraisopropyl titanate in 6.3 parts of anhydrous diethyl ether is added with stirring over a 10-minute period to a solution [prepared according to the procedure of Example 1(A)] of 10.5 parts of thiocarbonyl difluoride in 22 parts of anhydrous diethyl ether. The mixture is kept at −80° C. for 1⅔ hours. Then 40 parts of methanol is added and the heterogeneous mass is warmed to room temperature. The precipitated white polymer is collected, washed with methanol, immersed in boiling water for 30 minutes, rinsed with water and acetone, and dried at 70° C. There is obtained 7.92 parts of a tough, rubbery product exhibiting an inherent viscosity (0.1 percent solution in chloroform at 30° C.) of 3.0.

*Example 3*

35 parts of anhydrous diethyl ether and 0.5 part of tetra(2-ethyl hexyl)titanate are cooled to −80° C. in a dry agitated glass reaction flask provided with a nitrogen atmosphere and packed with a mixture of crushed solid carbon dioxide and acetone. 10.5 parts of thiocarbonyl difluoride is then distilled into the cold agitated solution over a 15-minute period. Afterward, the mixture is held at −80° C. for 30 minutes. 40 parts of methanol is then added and the heterogeneous mass warmed to room temperature. The precipitated white solid polymer is collected, washed with methanol, heated in boiling water for 15 minutes, washed with water and acetone, and dried at 70° C. There is obtained 8.43 parts of a tough, white elastomer exhibiting an inherent viscosity (0.1 percent chloroform solution at 30° C.) of 3.62.

*Example 4*

45 parts of alcohol-free chloroform is cooled to −55 to −60° C. in a dry agitated glass reaction vessel provided with an atmosphere of dry nitrogen. 8.4 parts of freshly distilled thiocarbonyl difluoride (containing 0.5 mole percent hydrogen chloride) is collected directly in the reaction flask. To the solution obtained is quickly added a solution of 0.3 part of tetraisopropyl titanate in 15 parts of alcohol-free chloroform. The reaction mixture is kept at −55 to −60° C. for 30 minutes longer. The temperature is then allowed to rise until the solid, which has formed, dissolves to give a clear viscous solution. After 40 parts of methanol has been added, the precipitated white polymer is collected, washed with methanol, heated for 15 minutes in boiling water, washed with water and methanol, and finally dried at 70° C. There is obtained 6.25 parts of a clear, weak, soft solid having an inherent viscosity (0.1 percent solution in chloroform at 30° C.) of 0.81.

*Example 5*

To an agitated dry glass reaction vessel provided with a dry nitrogen atmosphere is added 60 parts of alcohol-free chloroform and 1 part of tetraisopropyl titanate. The solution obtained is cooled to −25 to −30° C. Then 8.4 parts of freshly distilled thiocarbonyl difluoride is collected in the vessel over a 15-minute period. The temperature of the mixture is held at −25 to −30° C. for an additional 20 minutes while solid polymer separates. The temperature is then allowed to rise until all the solid matter has dissolved. 40 parts of methanol is added. The polymer thereby precipitated is collected, washed with methanol, dissolved in 75 parts of chloroform and reprecipitated by addition of 60 parts of methanol, washed again with methanol, and dried in a vacuum desiccator. 7.38 parts of a colorless syrup is obtained.

*Example 6*

37.8 parts of thiocarbonyl difluoride of high purity (prepared by pyrolysis of 49.1 parts of tetrafluoro-1,3-dithietane at 475° C., followed by a low temperature distillation of the pyrolysis products) was distilled into a reaction vessel containing 35.4 parts of sodium-dried diethyl ether and 0.028 part of tetraisopropyltitanate in 0.69 part of diethyl ether at −80° C. The polymerization was allowed to proceed 1 hour at this temperature. The ether was decanted and the polymer was washed several times with methanol in a high-speed mixer. After drying for 2 hours at 70° C. in vacuo, 30 parts of polythiocarbonyl difluoride was obtained. This polymer had an inherent discosity of 2.09, measured at 0.1 percent concentration in chloroform at 25° C.

As many widely different embodiments of this invention may be made without departing from the spirit and scope thereof, it is to be understood that this invention is not limited to the specific embodiments thereof except as defined in the appended claims.

What is claimed is:

1. In the process of homopolymerizing thiocarbonyl difluoride, the improvement comprising contacting the thiocarbonyl difluoride at a temperature of from about −80° C. to about −10° C. in an inert solvent, which is a liquid during the polymerization reaction, with from about 0.1 to 10.0 mole percent, based on the thiocarbonyl difluoride, of an alkoxide having the formula $M(OR)_n$ wherein M is selected from the group consisting of trivalent aluminum and tetravalent titanium, $n$ is an integer having a value equal to the valance of M and R is an alkyl radical, said alkoxide being soluble in diethyl ether.

2. A process according to claim 1 wherein the alkoxide is tetraisopropyl titanate.

3. In the process of homopolymerizing thiocarbonyl difluoride, the improvement comprising contacting the thiocarbonyl difluoride at a temperature of from about −80° C. to about −10° C. in an inert solvent, which is liquid during the polymerization reaction, selected from the group consisting of aliphatic saturated hydrocarbons, aromatic hydrocarbons, chlorinated aliphatic saturated hydrocarbons, chlorinated aromatic hydrocarbons, acyclic saturated aliphatic ethers, aromatic ethers and heterocyclic saturated aliphatic ethers, with from about 0.1 to 10.0 mole percent, based on the thiocarbonyl difluoride, of an alkoxide having the formula $M(OR)_n$ wherein M is selected from the group consisting of trivalent aluminum and tetravalent titanium, $n$ is an integer having a value equal to the valence of M and R is an alkyl radical of up to 9 carbon atoms.

References Cited in the file of this patent

"Perfluoroalkyl Derivatives of Sulfur," J.C.S., 1955, par. 3871–3880.

"Compt. Rend." 237, 900–902 (1953), abstracted in C.A., vol. 48, p. 3178b, 1954.